Oct. 10, 1950 E. M. LURIE 2,525,696

VOLUME CONTROL ARRANGEMENT

Filed Oct. 15, 1946

INVENTOR.
Eli M. Lurie
BY
Louis Shumacher, Atty.

Patented Oct. 10, 1950 2,525,696

UNITED STATES PATENT OFFICE 2,525,696

VOLUME CONTROL ARRANGEMENT

Eli M. Lurie, Laurelton, N. Y.

Application October 15, 1946, Serial No. 703,438

6 Claims. (Cl. 178—44)

This invention relates to electrical apparatus and has particular reference to radio receiver amplifying systems and variable volume control switches therefor.

One object of the invention is to provide a radio receiver or amplifying system of the character described, having improved means for controlling the volume of sound, including a switch which is free of stop elements that are subject to breakage due to forcing of the switch by the operator, whether this is done inadvertently, or with the desire of obtaining still greater volume of sound.

Another object of the invention is to furnish apparatus of the nature set forth having improved means to prevent a sudden drop in the volume of sound upon moving the control switch past the point of maximum volume.

In manufacturing devices of the class alluded to, I have encountered frequent objections due to the fact that the volume control switch was out of order or broken after use by the operator. I perceived that these difficulties were due to the usual provision of stops for the rotary control element of the variable switch, because the operator tended to force the switch against these stops and thereby imposed unusual strain on the switch, causing distortion or breakage thereof. I have also found that apparatus of this character utilizing switches affording a control of volume to a maximum point and then suddenly to zero were objectionable from the standpoint of the operator. To the best of my knowledge there have been no switches on the market which would remedy these difficulties.

It is therefore an object of the invention to furnish improved electrical equipment capable of overcoming the difficulties mentioned without any added expense or complication in construction.

Another object of the invention is the provision of an improved switch of the character described affording the advantages mentioned and which is simple and highly compact in construction, cheap to manufacture, and durable, reliable, and highly efficient in use, and adapted for a substantially longer life by reason of the arrangement of the resistance member of the switch.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

Figure 1:
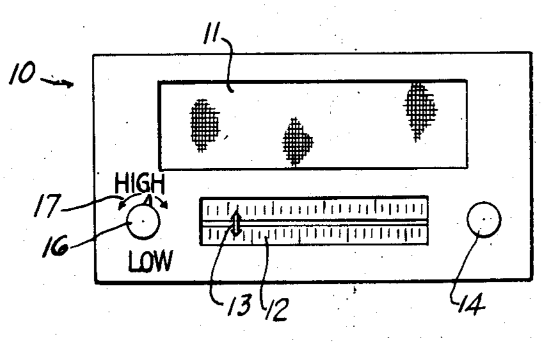
Figure 1 is a diagrammatic view in front elevation showing a radio receiver or the amplifying and station selector unit of a receiving system embodying the invention.
Figure 2:
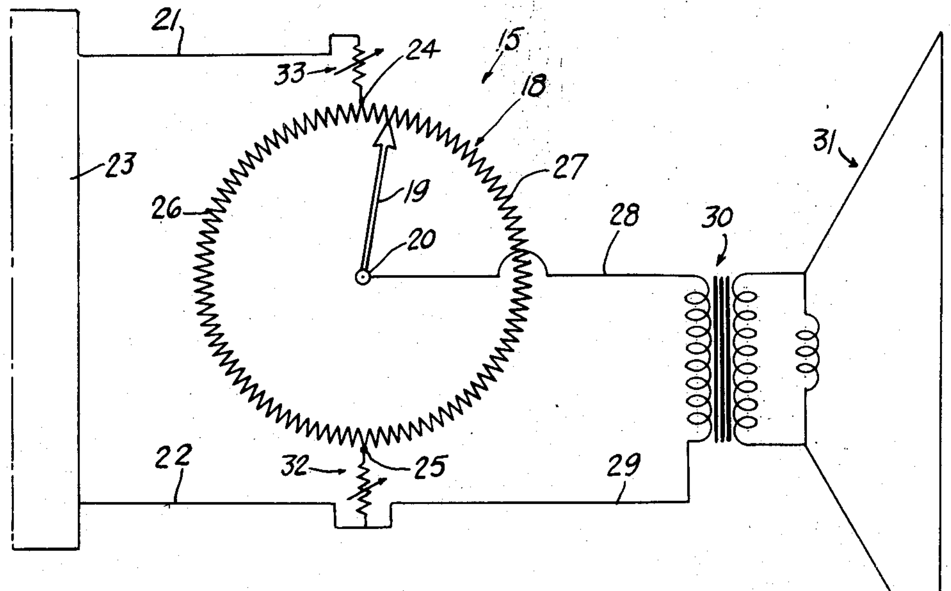
Fig. 2 is a fragmentary diagrammatic view of a typical circuit including my novel switch and illustrating the improved relation thereof to the circuit of a radio receiver amplifying device.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Generally described, the invention comprises a switch having a circularly continuous resistance member and a switch element having a central axis, the switch being connected into an electrical circuit so as to include opposed connections or terminals on the resistance member, and the arrangement being such that the switch element is adapted to describe one or more rotations along the resistance member, in either direction, from the low to the high terminal, the volume of sound being a maximum at the latter, and then past the same with the volume of sound diminishing. The point at which the maximum volume of sound is obtained is preferably a point of low effective resistance in the resistance member, and this depends primarily upon the design of the circuit. An essential feature is that the switch is free of any stops, and so cooperates with the parts thereof, that the switch element is continuously rotatable without encountering any obstruction which would materially strain the switch and cause possible distortion or breakage thereof. By this arrangement, the resistance member is in effect divided into two duplicate resistance sections, either of which can be used if the other burns out. An important feature is that if the operator has attained the position of maximum volume, a further movement of the switch causes diminution in volume which warns the operator of this fact, and avoids the jarring effect of a sudden complete cut-off of sound. The invention also includes a radio receiver circuit or amplifying circuit section embodying a switch as above described. The switch is adapted for other uses, but as indicated, its particular advantages are best exemplified in connection with the control of the volume of sound.

Referring in detail to the drawing, 10 denotes an apparatus embodying the invention. The same may include a signal output means, such as, a radio receiver or a unit comprising an amplifying and station selector means such as is customarily used in hotels having main trunk line circuits for the reception of radio signals from one or more sending stations. The unit 10 may include a loud speaker, the sound of which is emitted at 11, and station selector means including a dial 12, a pointer 13, and a control knob 14 for the latter. For the control of the volume of sound, a switch 15 is provided operated by a knob 16. This knob is adapted to make one or more substantially complete rotations in either direction, as indicated by the arrows 17. When the pointer of the knob is directed to low position there may be a minimum of volume, or the device 10 may be completely cut off at this position. When the pointer of the knob is directed toward the high position, there is a maximum volume of sound. These positions are indicated by the words "low" and "high." In turning the knob from the low to the high position, if the operator continues the movement, the switch is free to continue its rotation without encountering any stops or other obstructions, but now the volume of sound begins to gradually diminish, warning the operator that he has already attained the point of maximum volume, so that the operation of the switch is free of any sudden jarring cut-off of the sound.

The switch 15 may include any suitable substantially endless resistance member 18 of any suitable shape, preferably circular, for simplicity. This resistance member may be formed of wire or of any other suitable material well known in the art. Desirably the change in resistance along the member 18 is uniform, but it may also vary in an even and symmetrical manner as hereinafter apparent. A switch contact element 19 may have an axis at 20 central to the resistance member. This element 19 is adapted to make a rotation of approximately 360°; preferably the switch element is adapted for continuous rotation for as many turns as may be desired in either direction. The switch 15 is connected in any suitable manner well known in the art into an electrical circuit for which a variable control is desired. For example, the conductors 21, 22 lead from any suitable source 23 forming a part of a radio receiver or a portion of the amplifying circuit thereof, and these conductors 21, 22 may be considered as a part of a transmission line or so-called voice line, or part of a diode circuit. The conductors 21, 22 are connected to the resistance member 18 at 24, 25 which may be considered to be the terminals of the resistance member. The latter may be located at diametrically opposed points on the resistance member or in other suitable relation thereto, and thus they may be considered to divide the resistance member into a plurality of shunt sections 26, 27, which are identical in character from terminal 24 to terminal 25. If desired there may be a small gap in the resistance member at the terminal 25, which may thus include a plurality of spaced points for connection to the sections 26, 27. A circuit 28, 29, the former being a conductor from the switch element and the latter from the terminal 25, may include a transformer 30 for a suitable sound reproducing means, such as, loud speaker 31, the sound from which is being controlled by the operation of switch 15.

In use, if the amplifier system or receiver is shut off or at a position of minimum volume, the switch element 19 is at or adjacent to the terminal 25. Upon turning the latter in either direction toward the terminal 24, the resistance in the circuit 28, 29 diminishes and becomes a minimum at the terminal 24, at which the maximum volume of sound is attained. If the operator in attempting to obtain still greater volume continues to move the element 19 past the terminal 24, the volume of sound begins to gradually diminish, and of course he may then turn the switch element back to the terminal 24. The switch 15 is so constructed and arranged that there are no stops or obstructions against the relatively free movement of the switch element 19 so that there is no forcing and tendency to breakage of the switch by attempting to obtain increased volume, nor is there a sudden jarring cut-off of sound if the switch element is moved past the terminal 24. If either of the shunt sections 26, 27 should burn out, the other section may still be used. While the switch 15 is herein diagrammatically shown, it may be embodied in various constructions well known in the art, and as illustrated such constructions will lend themselves to a high degree of simplicity and compactness. It will thus be seen that I have provided apparatus fulfilling all the objects of the invention, and being embodied in a receiver or amplifying system or in a switch per se.

At 32 is shown a fixed or variable resistance whereby a minimum volume of sound may be obtained from the loud speaker 31 even if the switch 15 is at its normal cut-off position. In other words, there will never be a positive cut-off of the output current. In this manner various advantages are obtained because in the event of an air raid or fire, a message or signal may always be sent through the loud speaker to notify people of the hazard involved. If the signal current is very powerful, the notification may be sufficiently loud to accomplish the intended purposes, and nevertheless when regular radio broadcasts are received, the volume of sound may be relatively low.

At 33 is provided a fixed or variable resistance intended to provide a condition of maximum volume irrespective of the switch 15. This resistance may be replaced by an inductance. In other words, the device 33 creates a condition such that there will never be more volume of sound than that limited by this device, and the latter is preferably utilized as in hotel rooms for lowering the volume of sound to a fixed degree where the original level of sound volume is otherwise too high.

The devices 32 and 33 and the switch 15 may be used independently of each other, but the best results are obtained by utilizing the combination thereof.

I claim:

1. In a volume control arrangement for sound-frequency signal-energy supply circuit having two supply circuit portions of opposite polarity supplying signal energy to circuit terminals of a sound reproducing device for generating sound corresponding to said signal energy, an electrical resistance structure having two resistance sections connected in parallel between said two circuit portions of opposite polarity, said two resistance sections extending along opposite peripheral sections of a loop-like endless path and constituting opposite peripheral sections of a substantially continuous endless resistance path exposed along said endless path, a contact element continuously movable along said continuous path and arranged to establish electrical contact engagement with successive elements of said exposed endless resistance path, a circuit connection from a fixed element of said endless resistance path to one circuit terminal of said reproducing device and a circuit connection from said contact element to another circuit terminal of said sound reproducing device, and a rotatably mounted actuating member manually actuable for moving said contact element endlessly along said endless resistance path into engagement with successive elements of said endless resistance path so that in each complete cycle of movement of said contact element over the entire length of said endless resistance path—from a position corresponding to minimum volume of sound output—the volume of the sound output will gradually increase to a maximum volume and then gradual decrease to a minimum volume.

2. In combination with a sound frequency signal-energy supply circuit having two supply circuit portions of opposite polarity supplying signal energy to circuit terminals of a sound-reproducing device for generating sound corresponding to said signal energy, a volume control arrangement comprising an electrical resistance structure having two resistance sections connected in parallel and extending along opposite peripheral sections of a loop-like endless path so as to constitute opposite peripheral sections of a substantially continuous endless resistance path exposed along said endless path, a contact element continuously movable along said continuous path and arranged to establish electrical contact engagement with successive elements of said exposed endless resistance path, a first circuit connection from a relatively fixed element of said endless resistance path to one of said supply circuit portions, a second circuit connection from the other of said supply circuit portions to one circuit terminal of said reproducing device, and a third circuit connection from said contact element to another circuit terminal of said sound reproducing device, and a rotatably mounted actuating member manually actuable for moving said contact element endlessly along said endless path into engagement with successive elements of said endless resistance path so that in each complete cycle of movement of said contact element over the entire length of said endless resistance path—from a position corresponding to minimum volume of sound output—the volume of the sound output will gradually increase to a maximum volume and then gradually decrease to a minimum volume.

3. In combination with a sound frequency signal-energy supply circuit having two supply circuit portions of opposite polarity supplying signal energy to circuit terminals of a sound-reproducing device for generating sound corresponding to said signal energy, a volume control arrangement comprising an electrical resistance structure having two resistance sections connected in parallel and extending along opposite peripheral sections of a loop-like endless path so as to constitute opposite peripheral sections of a substantially continuous endless resistance path exposed along said endless path, a contact element continuously movable along said continuous path and arranged to establish electrical contact engagement with successive elements of said exposed endless resistance path, a first circuit connection from a relatively fixed element of said endless resistance path to one of said supply circuit portions, a second circuit connection from the other of said supply circuit portions to one circuit terminal of said reproducing device, and a third circuit connection from said contact element to another circuit terminal of said sound reproducing device, and a rotatably mounted actuating member manually actuable for moving said contact element endlessly along said endless path into engagement with successive elements of said endless resistance path so that in each complete cycle of movement of said contact element over the entire length of said endless resistance path—from a position corresponding to minimum volume of sound output—the volume of the sound output will gradually increase to a maximum volume and then gradually decrease to a minimum volume, additional impedance elements connected between an additional element of said endless resistance path and said second circuit connection from said other supply circuit portion to said one circuit terminal for independently setting the minimum volume of sound output in a minimum volume position of said contact element.

4. In combination with a sound frequency signal-energy supply circuit having two supply circuit portions of opposite polarity supplying signal energy to circuit terminals of a sound-reproducing device for generating sound corresponding to said signal energy, a volume control arrangement comprising an electrical resistance structure having two resistance sections connected in parallel and extending along opposite peripheral sections of a loop-like endless path so as to constitute opposite peripheral sections of a substantially continuous endless resistance path exposed along said endless path, a contact element continuously movable along said continuous path and arranged to establish electrical contact engagement with successive elements of said exposed endless resistance path, a first circuit connection from a relatively fixed element of said endless resistance path to one of said supply circuit portions, a second circuit connection from the other of said supply circuit portions to one circuit terminal of said reproducing device, and a third circuit connection from said contact element to another circuit terminal of said sound reproducing device, and a rotatably mounted actuating member manually actuable for moving said contact element endlessly along said endless path into engagement with successive elements of said endless resistance path so that in each complete cycle of movement of said contact element over the entire length of said endless resistance path—from a position corresponding to minimum volume of sound output—the volume of the sound output will gradually increase to a maximum volume and then gradually decrease to a minimum volume, an additional element of said endless resistance path being connected to said other supply circuit portion, the first circuit connection from said relatively fixed element of said endless resistance path to said one of said supply circuit portions including impedance elements for independently setting the maximum volume of sound output in the maximum volume position of said contact element.

5. In combination with a sound frequency signal-energy supply circuit having two supply circuit portions of opposite polarity supplying signal energy to circuit terminals of a sound-reproducing device for generating sound corresponding to said signal energy, a volume control arrangement comprising an electrical resistance structure having two resistance sections connected in parallel and extending along opposite peripheral sections of a loop-like endless path so as to constitute opposite peripheral sections of a substantially continuous endless resistance path exposed along said endless path, a contact element continuously movable along said continuous path and arranged to establish electrical contact engagement with successive elements of said exposed endless resistance path, a first circuit connection from a relatively fixed element of said endless resistance path to one of said supply circuit portions, a second circuit connection from the other of said supply circuit portions to one circuit terminal of said reproducing device, and a third circuit connection from said contact element to another circuit terminal of said sound reproducing device, and a rotatably mounted actuating member manually actuable for moving said contact element endlessly along said endless path into engagement with successive elements of said endless resistance path so that in each complete cycle of movement of said contact element over the entire length of said endless resistance path—from a position corresponding to minimum volume of sound output—the volume of the sound output will gradually increase to a maximum volume and then gradually decrease to a minimum volume, additional impedance elements connected between an additional element of said endless resistance path and said additional circuit connection from said other supply circuit portion to said one circuit terminal, the circuit connection from said relatively fixed element of said endless resistance path to said one of said supply circuit portions including further impedance elements for independently setting the maximum volume of sound output in the maximum volume position of said contact elements.

6. In the combination as claimed in claim 2, said two resistance sections being connected in parallel between said two supply circuit portions of opposite polarity.

ELI M. LURIE.

REFERENCES CITED

The following references are of record in the file of this patent:

UNITED STATES PATENTS

| Number | Name | Date |
|---|---|---|
| 1,839,968 | Jones | Jan. 5, 1932 |
| 2,157,557 | Mueller | May 9, 1939 |
| 2,257,731 | Coe | Oct. 7, 1941 |
| 2,371,415 | Tolson | Mar. 13, 1945 |
| 2,404,387 | Lovell et al. | July 23, 1946 |
| 2,435,195 | Bomberger | Feb. 3, 1948 |